United States Patent [19]
Scannell

[11] 3,790,179
[45] Feb. 5, 1974

[54] PACKING
[75] Inventor: John B. Scannell, Long Beach, Calif.
[73] Assignee: Parker-Hannifin Corporation, Cleveland, Ohio
[22] Filed: Jan. 10, 1972
[21] Appl. No.: 216,696

[52] U.S. Cl. ............................. 277/124, 277/205
[51] Int. Cl. ........................ F16j 15/18, F16j 15/32
[58] Field of Search 277/123, 124, 205, 212, 212 C

[56] References Cited
UNITED STATES PATENTS
3,586,341 6/1971 Whittaker ............................ 277/124
2,442,687 6/1948 Heathcott ............................ 277/124

Primary Examiner—Louis R. Prince
Assistant Examiner—Robert I. Smith
Attorney, Agent, or Firm—John N. Wolfram

[57] ABSTRACT

An annular generally V shaped sealing ring for use in multi-ring packing assemblies for hydraulic sealing applications, the ring having a flat base and a flat seat on the opposite side of the ring for accommodating the base of a similar, adjacent sealing ring. The ring also having two sealing lips, the inner and outer sides of each lip extending from the radially corresponding inner and outer edges of the base and seat, and the lips being formed such that, when the base of one ring is abutting the seat of another, the lips of the one ring do not contact the lips of the other except at high system fluid pressures.

4 Claims, 4 Drawing Figures

PATENTED FEB 5 1974 3,790,179

3,790,179

PACKING

BACKGROUND OF THE INVENTION

Sealing rings disposed between two relatively movable members must provide an effective seal throughout a pressure range from zero to above normal operating pressures. Frequently, high axial mechanical loading is used to deform the sealing lips of multi-ring packing assemblies for establishing sealing contact at low pressures. Constant mechanical loading of the lips tends to cause permanent deformation and excessive wear of the sealing lips thereby reducing the sealing efficiency and/or life of the rings. The use of axial mechanical loading of necessity requires that the axial length of the packing and gland be closely controlled to achieve the precise mechanical loading required on the lips.

Another known method of accomplishing low pressure sealing is to use auxilliary axial or radial mechanical loading devices such as springs or lip spreaders. Such loading devices likewise reduce the life and/or efficiency of the sealing rings.

SUMMARY OF THE INVENTION

The above shortcoming of the previous designs are overcome by providing a seal ring for a multi-ring assembly in which there is no mechanical loading of the lips at low pressure and the radial sealing pressure is substantially proportional to system fluid pressure. The lips are formed such that when one ring initially abuts another there is a diverging gap located between the respective lips throughout their entire length. The radial distance between the lips of each ring is greater than the radial width of the gland groove whereby the lips are deformed into initial sealing engagement with the surfaces to be sealed when inserted into the groove. The diverging gap throughout the lengths of the lips is maintained both upon initial installation in the packing groove and upon application of low fluid pressure whereby at zero and low pressures the lips seal independently of mechanical loading.

Each seal ring has a flat base and a flat seat on the other side to accommodate the base of an adjacent seal. These flat surfaces absorb axial loading forces, whether exerted mechanically or by moderate fluid pressure, without transmission to the lips thus allowing the lips to act independently of axial loading until high fluid pressure is imposed.

At high pressures, the lips deform closing the gap between adjacent sealing rings forcing the lips to exert higher sealing pressure.

DETAILED DESCRIPTION

Figure 1:
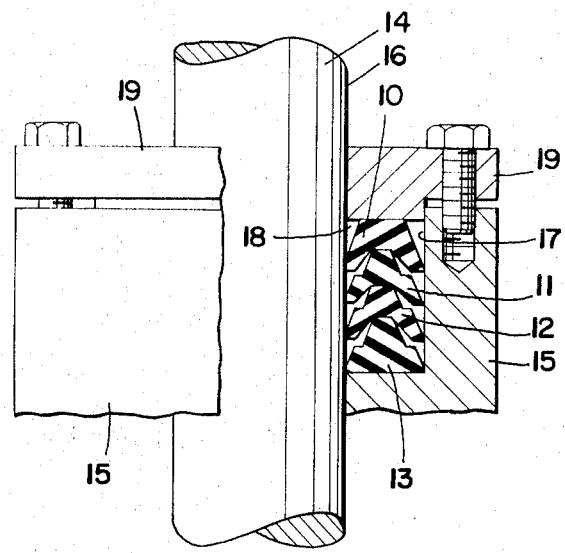
FIG. 1 is a partial sectional view of two relatively reciprocable members employing the sealing ring of the present invention.

FIG. 1 illustrates a sealing device using stacked sealing rings 10, 11, 12, 13 for use between two relatively rotating members 14, 15. Seals 10, 11, 12, 13, which may be of elastomeric or deformable plastic material, are disposed to seal between surface 16 of the rod 14 and surface 17 of gland 15. Surfaces 16 and 17 form gland groove 18. Gland 15 has a movable insert 19 to exert variable axial compression upon the sealing rings 10, 11, 12, 13.

Figure 2:
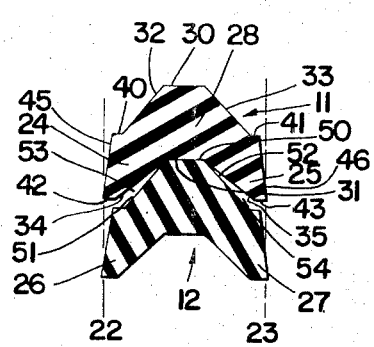
FIG. 2 is a sectional view of two sealing rings of FIG. 1 in the free state.

FIG. 2 shows rings 11, 12 of FIG. 1 before insertion into the gland groove 18. The dashed lines 22, 23 indicate the radial limits of the gland groove 18 of FIG. 1 in relation to the free undeformed position of the seal lips 24, 25, 26, 27 of seal rings 11, 12.

A typical seal ring 11 includes base portion 28 having upper 30 and lower 31 flat transverse faces. From the upper face extend surfaces 32, 33 at an obtuse angle and from the lower face 31 extends surfaces 34, 35 at a greater obtuse angle than that formed by the upper face 30 and surfaces 32, 33. Surfaces 32, 33, 34, 35 become transverse surfaces 40, 41, 42, 43 respectively which have sealing surfaces 45, 46 disposed between them at a slight angle to the surface to be sealed.

Lower face 31 of seal ring 11 abuts the upper face 50 of seal ring 12. Surfaces 51, 52 of ring 12 and surfaces 34, 35 of ring 11 form diverging spaces 53, 54.

OPERATION

Figure 3:
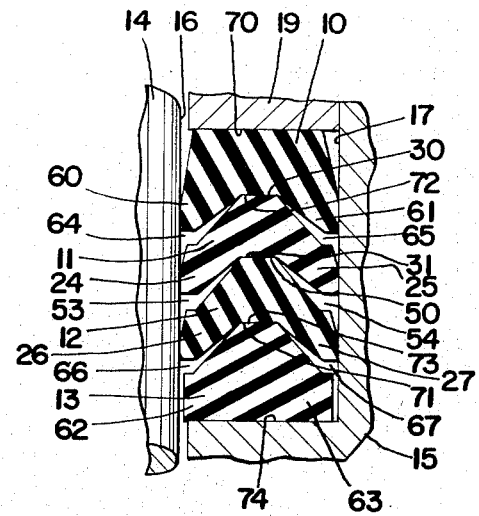
FIG. 3 is an enlarged sectional view of the sealing rings of FIG. 1 under zero system pressure.

FIG. 3 shows sealing rings 10, 11, 12, 13 inserted in the gland groove 18 at zero system pressure. Sealing lips 24–27, 60, and 61 are compressed to fit into the gland groove 18. This compression causes the lips to exert radial pressure on the surfaces 16, 17 to achieve static or low pressure sealing. At zero pressure, diverging spaces 53, 54, 64–67 are smaller than during the free uncompressed state shown in FIG. 2. As the system pressure increases the lips deform and the spaces become increasingly smaller thereby causing the lips to exert increasing pressure on surfaces 16, 17.

Axial mechanical compression of the rings between insert 19 and gland 15 is absorbed through upper faces 30, 50, 70, 71 and lower faces 31, 72, 73, 74 such that this axial compressive force is not transmitted to the lips. Thus overlength or underlength gland groove 18 will not affect the static and low pressure sealing force exerted by the lips.

Figure 4:
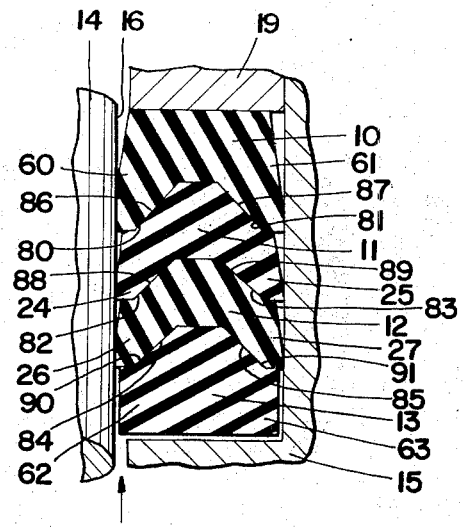
FIG. 4 is an enlarged sectional view of the sealing rings of FIG. 1 under high system pressure.

FIG. 4 shows the sealing rings of FIG. 3 under deformation from elevated system pressure. The high fluid pressure compresses the packing assembly axially thus causing lips 24–27, 60–63 to deform such that surfaces 80–85 are in contact with surfaces 86–91 respectively. The sealing pressure exerted by the lips on the surfaces 16, 17 at high system pressures, will vary according to the system fluid pressure since this pressure exerts a compressive force on the packing assembly which is coverted into a radial expansion force acting through the lips on the surfaces 16, 17.

I claim:

1. A sealing ring of substantially V shaped cross section comprising a base having upper and lower flat transverse faces and having radially inner and outer surfaces that include upper and lower tapered portions with a transverse shoulder therebetween, radially opposed inner and outer diverging lips extending generally axially from said base, each lip having radially inner and outer surfaces angled relative to a transverse plane, the angle of the lip inner surfaces being smaller than the angle of the lip outer surfaces, and the base upper tapered portion having an angle to said plane that is less than the angle of the lower tapered portion relative to said plane.

2. The ring of claim 1 in which the free ends of lips have transverse faces of a width greater than the width of said shoulders and the width of said upper face is no greater than the width of said lower face.

3. In combination, inner and outer members forming an annular chamber therebetween with one end of the chamber exposed to fluid contained by said members, said chamber having opposed radially spaced inner and outer surfaces to be sealed, first and second generally V shaped elastomeric sealing rings in said chamber, said first ring having a base with a lower transverse face and having radially opposed inner and outer diverging lips extending generally axially from said base, said lips each having an inner surface extending at an angle to a transverse plane, said second ring nested in the first ring and having a base with an upper transverse face in engagement with the lower transverse face of the first ring and also having a lower transverse face, the base of the second ring having diverging radially inner and outer surfaces of axial length slightly longer than the axial length of the lips on said first ring and having an angle relative to said plane that is smaller than said angle of the inner lip surfaces of said first ring whereby there is an initial wedge shaped clearance between said base radially outer surfaces of the second ring and the lip inner surfaces of the first ring, and said second ring being deformable by high pressure fluid entering said one end of said chamber whereby said base radially outer surfaces of the second ring as forced against said lip inner surfaces of said first ring to press the lips of the first ring into tighter engagement with said member surfaces.

4. The combination of claim 3 in which said base inner and outer surfaces of said second ring include upper and lower portions with a transverse shoulder therebetween, said lips of said first ring have flat transverse faces at their free ends that engage said shoulders when said second ring is deformed by high fluid pressure.

* * * * *